United States Patent Office 2,729,963
Patented Jan. 10, 1956

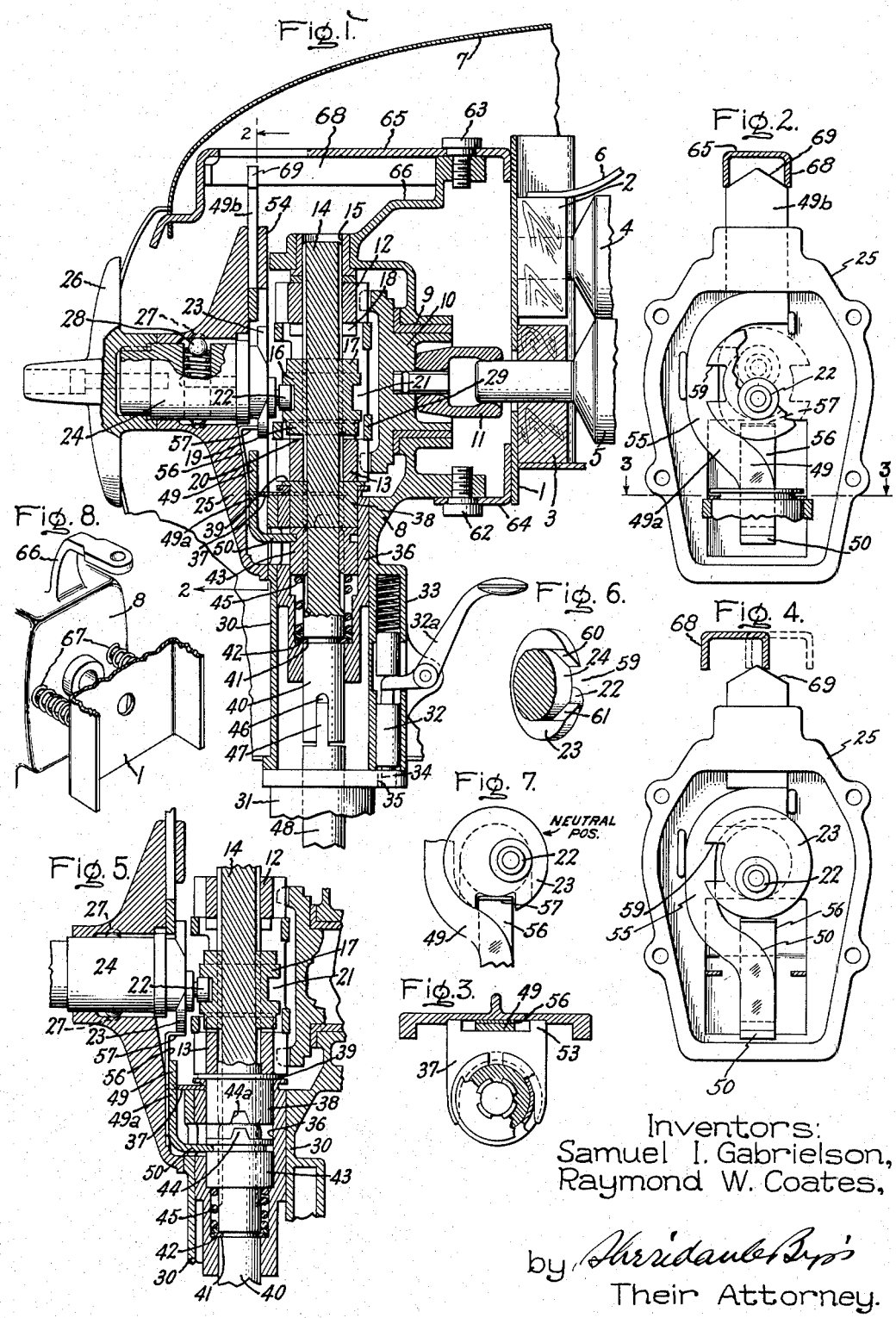
Inventors:
Samuel I. Gabrielson,
Raymond W. Coates,
Their Attorney.

2,729,963

CLOTHES WRINGER RELEASE MECHANISM

Samuel I. Gabrielson, East Lynn, and Raymond W. Coates, Bridgeport, Conn., assignors to General Electric Company, a corporation of New York Application August 13, 1952, Serial No. 304,164

9 Claims. (Cl. 68—249)

The present invention relates primarily to clothes wringers of the type wherein the wringer frame is pivoted on the wringer head and is held from swinging relatively to the head by spring means, an emergency release means being operated when the frame swings in either direction with respect to the head against the action of the spring means.

The object of the invention is to provide an improved construction and arrangement of emergency release mechanism in a wringer of this type, and for a consideration of what we believe to be novel and our invention, attention is directed to the following specification and to the claims appended thereto.

According to our invention we provide a clutch in the wringer drive between the main drive shaft and the wringer gearing and novel means for opening the clutch and locking it open when the wringer frame swings in either direction relatively to the wringer head; and in connection therewith, we provide novel means which prevents release of the locking means and the closing of the clutch except when the wringer gearing is in neutral position.

In the drawing, Fig. 1 is a sectional view of a part of a clothes wringer embodying our invention, the safety release clutch being shown in closed position and the wringer gearing in mesh to drive the wringer rolls in one direction; Fig. 2 is a detail view taken on section lines 2—2, Fig. 1, but with parts not in the section added to better illustrate the construction; Fig. 3 is a detail sectional view taken on line 3—3, Fig. 2; Fig. 4 is a view similar to Fig. 2 showing the parts in clutch released position; Fig. 5 is a detail view similar to Fig. 1 showing the parts in clutch released position, and Figs. 6, 7 and 8 are detail sectional views showing certain of the wringer parts.

Referring to the drawing, 1 indicates an end of the wringer frame which carries bearing blocks 2 and 3 in which are positioned the shaft ends of upper and lower wringer rolls 4 and 5. At 6 is a bar which at its upper end engages the bearing blocks to apply pressure to them, and at 7 is a cover plate. Only the left-hand end of the wringer frame and the rolls is illustrated, as wringer structures of this type are well known and the portion illustrated is sufficient for an understanding of the invention. The wringer head is indicated at 8. It is shaped to provide a bearing 9 for a crown gear 10 which is connected to drive lower roll 5 by a suitable coupling 11. Meshing with crown gear 10 are upper and lower spaced driving or reversing gears 12 and 13 rotatably mounted to turn on a gear shaft 14 which is supported at its upper end in a bearing 15. Splined on shaft 14 so as to slide along it is a gear clutch spool 16 having teeth 17 on its upper end adapted to engage clutch teeth 18 on gear 12 when the spool is moved upward and clutch teeth 19 on its lower end adapted to engage clutch teeth 20 on gear 13 when the spool is moved downward. At its central portion, clutch spool 16 is provided with an annular groove 21 in which is located a pin 22 eccentrically mounted on a disk 23 carried by a barrel 24 journaled in an opening in a wringer head cover plate 25 which is attached to head 8. Disk 23 forms in substance a flange on the inner end of barrel 24. On the outer end of barrel 24 is an operating knob 26. By turning knob 26, the barrel 24 and pin 22 are turned to shift clutch spool 16 from a central neutral position where it engages neither gear 12 nor gear 13 to an operating position where it engages one or the other. These three positions are indexed by spaced depressions 27 in cover plate 25 with which spring pressed balls 28 carried by barrel 24 engage. Gears 12 and 13 are held in spaced relation relatively to each other by a suitable spacing cage 29. In Figs. 1 and 5, knob 26 is shown as having been turned counter-clockwise when viewed from the left from neutral position to a position where such spool 16 engages gear 13. This is a known type of clothes wringer reversing gear drive, the operation of which is well understood by those familiar with clothes wringer design.

Depending from head 8 is a tubular wringer supporting post 30 provided with a flange at its lower end which rests on the upper end of a post 31 which forms a part of the clothes washing machine upon which the wringer is mounted. Post 31 forms a support for the wringer on which it may pivot as a unit in a horizontal plane. Its position is indexed by a spring pressed pin 32 carried in a boss 33 on the side of post 30 and provided with an end 34 adapted to fit into indexing openings 35 formed in a flange at the upper end of post 31. An operating lever for pin 32 is indicated at 32a. This arrangement permits of the wringer being adjusted in a horizontal plane with respect to the clothes washing machine on which it is mounted.

In the upper end of post 30 is a drive shaft and clutch bearing sleeve 36 supported on the top of post 30 by a U-shaped retaining washer 37, the arms of which slide around opposite sides of sleeve 36 in a groove in the sleeve. (See Fig. 3.) Journaled in the upper end of bearing sleeve 36 is a clutch collar 38 which is splined on the lower end of gear shaft 14 and turns with the shaft in sleeve 36 thus providing a bearing for the lower end of shaft 14. Collar 38 is supported in sleeve 36 by a flange 39 at its upper end. It forms a support for lower gear 13 on which the gear turns. Journaled in the lower portion of bearing sleeve 36 is a coupling shaft 40 supported in the bearing by a thrust collar 41 which is positioned in a groove in shaft 40 and rests on a shoulder 42 in sleeve 36. The lower end of gear shaft 14 rests on and is supported by the upper end of shaft 40. Splined on shaft 40 and movable vertically thereon is a clutch 43 having a plurality of upwardly extending projections or clutch teeth 44 adapted to engage in recesses 44a in clutch collar 38. Clutch 43 is biased upward to closed position by a spring 45 positioned between thrust collar 41 and the underside of the clutch.

The lower end of coupling shaft 40 is provided with a transverse slot 46 in which fits a tongue 47 on the upper end of main wringer drive shaft 48 which may be driven from the washing machine motor. When the clutch is engaged as shown in Fig. 1, drive shaft 48 turns coupling 40 which in turn through the clutch turns gear shaft 14 for driving the wringer rolls. When the clutch is open, coupling shaft 40 and clutch 43 turn idly in the lower portion of bearing sleeve 36.

For moving clutch 43 to open position, there is provided a sliding shift plate 49 which slides along the inner surface of cover plate 25 and has an inturned finger at its lower end which extends through openings in post 30 and bearing sleeve 36 and engages in an annular groove in clutch 43. At its lower end shift plate 49 is guided by spaced ears (not shown) on the inside of cover 25 between which it slides and it is held between the spaced ears by retaining washer 37 which is spaced from the inner surface of cover plate 25 by ears 53 on the U-shaped retaining washer 37 as shown in Fig. 3. At its upper end, it is guided by a wall 54 which forms a part of wringer head cover 25. Plate 49 has a bowed-out central portion 55 which extends around barrel 24, the arrangement being such that the plate may be moved vertically relatively to the barrel. In the present instance shift plate 49 is shown as comprising two parts, a lower part 49a and an upper part 49b, the upper part resting on top of the lower part. This is for manufacturing reasons. The two parts act as a single shift plate since a compressive load on each end forces them together at all times and for practical purposes may be regarded as a single plate.

Attached to the lower end of plate 49 is an upwardly projecting spring locking strip 56 provided at its upper end with an inturned locking finger 57 which cooperates with disk 23, and functions as a latching means. When clutch 43 is closed, the end of finger 57 rides on the side surface of disk 23 as shown in Figs. 1 and 2. When shift plate 49 is moved downward to open the clutch, the finger snaps under disk 23 as shown in Figs. 4 and 5 to lock or latch the clutch in open position. In disk 23 is a notch 59 and formed on the one face of disk 23 adjacent the notch on opposite sides of it are two adjacent cam surfaces 60 and 61 along which finger 57 may ride. When clutch spool 16 is in neutral position, latch finger 57 stands in notch 59. When moved in either direction to engage the clutch spool with one or the other of gears 12 and 13, finger 57 rides up one or the other of the cam surfaces 60 and 61 to bring the end against the side face of the disk.

Wringer frame 1 is pivotally mounted on head 8 by lower and upper pivot screws 62 and 63. Pivot screw 62 is positioned in an opening in a lower pivot bracket 64 fixed to frame 1. Pivot screw 63 is positioned in an opening in an actuating arm 65 fixed to frame 1, its lower end threading into a pivot arm 66 on head 8. Frame 1 is held yieldingly centered with respect to head 8 by two spaced springs 67 (Fig. 8) positioned between the frame and the head. Springs 67 normally hold the frame 1 in alignment with wringer head 8 but permit the frame to turn relatively to the head on pivot pins 62 and 63 in either direction in case of a push or pull on the frame of more than a predetermined amount.

Shift plate 49 is arranged to be moved to open clutch 43 whenever frame 1 is turned with respect to head 8 beyond a predetermined amount. To this end actuating arm 65 is provided with side walls 68, i. e. arm 65 is U-shaped in transverse section, which engages cam surfaces 69 on the upper end of shift plate 49. When frame 1 is turned relatively to head 8 against the action of springs 67 in either direction, one or the other of side walls 68 will ride against a cam surface 69 to force downward movement of shift plate 49 and the opening of clutch 43. This is illustrated clearly in Figs. 2 and 4, Fig. 2 showing the parts in normal position in which position clutch 43 is closed and Fig. 4 showing arm 65 as having been moved with respect to shift plate 49 from the dotted line position to the full line postion whereby the shift plate has been moved down to open clutch 43.

The operation is as follows:

With the wringer parts in normal position and knob 26 in neutral position, clutch spool 16 is centered out of position with gears 12 and 13. Springs 67 hold the wringer frame yieldingly in alignment with wringer head 8 with side walls 68 in engagement with cam surfaces 69. This action is assisted by spring 45 acting compressively through shift plate 49 to engage cam surfaces 69 with arm 65. Clutch 43 is held closed by spring 45 which also holds shift plate 49 in its up position. Locking finger 57 is in notch 59 as shown in Fig. 7. At this time, the washing machine motor may be turning shaft 48, coupling 40, clutch 43, clutch collar 38, gear shaft 14 and clutch spool 16 but the wringer rolls will not be driven since clutch spool 16 is in neutral position. The wringer rolls may be operated in either direction by turning knob 26 to bring clutch spool 16 in engagement with one or the other of the gears 12 or 13.

In Fig. 1, clutch spool 16 is shown as having been turned by knob 26 and moved down in engagement with gear 13 to effect driving of the wringer rolls in one direction. When knob 26 is thus turned from neutral position, disk 23 is turned from the neutral position shown in Fig. 7 to the position shown in Figs. 1 and 2 wherein the end of latch finger 57 rests against the side of disk 23. If now wringer frame 1 is turned on its pivot 62—63, with respect to head 8, a side wall 68 will engage one or the other of the cam surfaces 69 forcing shift plate 49 down as shown in Fig. 5 to open clutch 43 and thus disrupt the drive to the wringer rolls since gear shaft 14 would be disconnected from coupling 40.

The wringer may be used in a normal manner to wring clothes as long as the wringer frame is not turned relatively to head 8. If while in use there is an unusual pull or push applied to the wringer frame, either by the operator due to some emergency or by a drag effected by clothes or other thing being pulled in between the wringer rolls, the wringer frame will turn on its pivot against the action of springs 67 to lower shift plate 49 and open clutch 43. When this occurs, latch finger 57 springs to a position under disk 23 as shown in Figs. 4 and 5, thus latching clutch 43 down in open position. When the pull or push on the wringer frame is removed, springs 67 will return the wringer frame to normal position. However, shift plate 49 will be held in clutch releasing position and the clutch will be held open by locking finger 57.

To restore the wringer to normal condition after an emergency operation as just described, it is necessary to turn knob 26 to bring clutch spool 16 to neutral position. This would require a turning movement of knob 26 in a clockwise direction as viewed in Figs. 1 to 5. When thus turned, notch 59 will be brought in line with locking finger 57 thus permitting spring 45 to move shift plate 49 up and to close clutch 43. The wringer gears will be now in neutral position and the wringer may be again used in normal manner.

If at the time frame 1 was turned on its pivot, clutch spool 16 had been in engagement with gear 12, the operation for restoring the parts to normal position would have been the same except that knob 26 would be turned in the other direction to bring it to neutral position since it would have been turned clockwise initially as viewed in Fig. 1 to bring the clutch into engagement with gear 12.

By our invention we provide a wringer release mechanism which is simple in structure, reliable in operation and capable of being manufactured at low cost. It is positive in operation and safe to use since following any emergency operation the driving clutch is locked in open position and the driving gearing for the wringer rolls must be restored to neutral position before the wringer can be again put in operation. In connection with the operation of the emergency release means it is to be noted that the clutch release is entirely independent of the operating knob or handle 26, the knob or handle being not moved or restored to neutral position when the clutch release is operated by turning the wringer frame relatively to the wringer head. This is a feature of importance from a safety standpoint since it means that should the operator, in case of an emergency, grasp the knob or handle in an attempt to move it back to neutral (a thing the operator might attempt to do instinctively) such grasping and holding of the knob or handle would not in any way interfere with the emergency release of the clutch.

What we claim as new and desire to secure by Letters Patent of the United States is:

1. In a clothes wringer, a wringer head, a frame, means pivotally and yieldingly connecting the frame to the head, wringer rolls journaled in the frame, gearing including a gear shaft in the head by which said rolls are driven, an operating member for controlling said gearing and movable from a neutral non-driving position to a driving position for selecting direction of roll rotation, an input drive shaft, a drive clutch for connecting said input drive shaft to the gear shaft, means biasing said drive clutch into engagement, a shift member connected to the drive clutch for moving it, means carried by the frame which when the frame is turned relatively to the head effects movement of the shift member to open said drive clutch, latch means operated upon movement of said shift member to open the drive clutch for locking said drive clutch in open position, and means responsive to movement of said operating member to neutral position for moving said latch means to release said drive clutch.

2. In a clothes wringer, a wringer head, a frame, means pivotally and yieldingly connecting the frame to the head for lateral movement with respect thereto, wringer rolls journaled in the frame, a transmission including a gear shaft in the head by which said rolls may be driven, an operating member movable from a neutral non-driving position to a closed position for effecting the drive connection from said gear shaft to said rolls, an input drive shaft, a drive clutch for connecting said input drive shaft to the gear shaft, means biasing said clutch into engagement, a shift member connected to the drive clutch for moving it, means carried by the frame which when the frame is turned relatively to the head effects movement of the shift member to open said drive clutch, latch means carried by said shift member which upon movement of said shift member locks said drive clutch in open position, and means responsive to movement of said operating member to neutral position for moving said latch means to release said drive clutch.

3. In a clothes wringer, a wringer head, a frame, means pivotally and yieldingly connecting the frame to the head, wringer rolls journaled in the frame, gearing including a gear shaft in the head by which said rolls may be driven, an operating member for effecting the driving connection from said gear shaft to said rolls and movable from a neutral non-driving position to a driving position, a disk having a notch therein which turns with said operating member, a drive shaft, a drive clutch for connecting the drive shaft to the gear shaft, resilient means biasing said drive clutch into engagement, a shift member connected to the drive clutch for moving it, means carried by the frame which when the frame is turned relatively to the head effects movement of the shift member to open said drive clutch, and latch means which upon movement of said shift member to open the drive clutch engages the periphery of said disk to lock said drive clutch in open position, said notch being so located on the disk that when said operating member is turned to neutral non-driving position the notch is positioned in line with said latch means to permit it to enter said notch and release said drive clutch.

4. In a clothes wringer, a wringer head, a frame, means pivotally and yieldingly connecting the frame to the head, wringer rolls journaled in the frame, a transmission including a gear shaft in the head by which said rolls are driven, an operating member for controlling said transmission and movable from a neutral non-driving position to a position effecting the driving connection from said gear shaft to said rolls, a disk having a notch therein which turns with said operating member, a drive shaft, a drive clutch for connecting the drive shaft to the gear shaft, means biasing said clutch into closed position, a shift member connected to the drive clutch for moving it, means carried by the frame which when the frame is turned relatively to the head effects movement of the shift member to open said drive clutch, and latch means carried by said shift member which upon movement of said shift member to open said drive clutch engages the periphery of said disk to lock said drive clutch in open position, said notch being so located on the disk that when said operating member is turned to neutral position the notch is positioned in line with said latch means to permit it to enter said notch and release said drive clutch.

5. In a clothes wringer, a wringer head, a frame, means pivotally and yieldingly connecting the frame to the head, wringer rolls journaled in the frame, a transmission including a gear shaft in the head by which said rolls are driven, an operating member for controlling said transmission and movable from a neutral non-driving position to a closed position in which said rolls are drivingly connected to said gear shaft, said operating member having on its inner end a disk with a notch therein, a drive shaft, a drive clutch for connecting the drive shaft to the gear shaft, means biasing said clutch into engagement, a shift member connected to the drive clutch for moving it, means carried by the frame which when the frame is turned relatively to the head effects movement of the shift member to open said drive clutch, spring latch means carried by said shift member having an end which normally rests against a side surface of said disk and which upon movement of said shift member to open the drive clutch engages the periphery of said disk to lock said drive clutch in open position, said notch being so located on the disk that when said operating member is turned to neutral position the notch is positioned in line with said latch means to permit it to enter said notch and release said drive clutch, said disk adjacent to said notch having a cam surface upon which said latch means rides when the disk turns to move the latch means out of said notch.

6. In a clothes wringer having wringer rolls, a wringer head, reversing gearing in the head for driving the rolls including a gear shaft, an operating member pivoted in the wringer head for controlling said reversing gearing and movable from neutral to gear drive positions, a disk which turns with said operating member, said disk having a notch therein, a drive shaft, a drive clutch for connecting the drive shaft to said gear shaft, means biasing said drive clutch into engagement, a shift member for moving said drive clutch, manually operable means for moving said shift member to open said clutch, and latch means carried by said shift member which when the shift member is moved to open said drive clutch engages the periphery of said disk to lock the drive clutch in open position in said gear drive positions of said operating member, said notch being so located on the disk that when said operating member is returned to neutral position the notch is positioned in line with said latch means to permit said biasing means to move said drive clutch to engagement, said disk adjacent said notch having cam surfaces up which said latch means rides when the disk turns with said operating member to move the latch means out of said notch without disengaging said drive clutch.

7. In a clothes wringer having wringer rolls, a wringer head, reversing gearing in the head for driving the rolls including a gear shaft, an operating member pivoted in the wringer head for controlling the reversing gearing and movable from neutral to closed positions, a disk on the operating member which turns with it, said disk having a notch therein, a drive shaft, a drive clutch for connecting the drive shaft to said gear shaft, means biasing said drive clutch into engagement, a sliding shift member for moving said drive clutch which extends past said disk, a spring latch finger carried by said shift member which when the drive clutch is closed rests against a side surface of said disk and which when the shift member is moved to open said drive clutch engages the periphery of said disk to lock the drive clutch in open position, said notch being so located on the disk that when said operating member is in neutral position the notch is positioned in line with said latch finger to permit it to enter said notch to release the drive clutch, said disk adjacent said notch having cam surfaces up which said latch finger rides when the disk turns to move the latch finger out of said notch, and manually operable means for sliding said shift member to open said drive clutch.

8. In a clothes wringer, a wringer head, a frame, means pivotally and yieldingly connecting the frame to the head, wringer rolls journaled in said frame, reversing gearing in the head for driving said rolls including a gear shaft, an operating member pivoted in the wringer head for controlling the reversing gearing and movable from neutral to closed positions, a disk which turns with said operating member, said disk having a notch therein, a drive shaft, a drive clutch for connecting the drive shaft to said gear shaft, resilient means biasing said drive clutch to closed position, a sliding shift member for moving said drive clutch which extends past said disk to a position above said head, a spring latch finger carried by said shift member which when the shift member is moved to open said drive clutch engages the periphery of said disk to lock the drive clutch in open position, said notch being so located on the disk that when said operating member is in neutral position the notch is positioned in line with said latch finger to permit it to enter said notch to release the drive clutch, said disk adjacent said notch having cam surfaces up which said latch finger rides when the disk turns to move the latch finger out of said notch, and cooperating cam means carried by the upper end of said shift member and said wringer frame which when the wringer frame turns on the head effects movement of said shift member to open said drive clutch.

9. In a clothes wringer, a wringer head, a frame, means pivotally and yieldingly connecting the frame to the head for lateral movement with respect thereto, wringer rolls journaled in the frame a transmission including a gear shaft in the head by which said rolls are driven, an operating member controlling said transmission movable from a neutral open position to a closed position, an input drive shaft, a drive clutch for connecting said input drive shaft to the gear shaft, means biasing the drive clutch to closed position, a shift member connected to the drive clutch for moving it, means carried by the frame which when the frame is turned relatively to the head responsive to an abnormal lateral force effects movement of the shift member to open said drive clutch, latch means operated upon movement of said shift member to open the drive clutch for locking said drive clutch in open position, and cam means effective upon movement of said operating member through neutral position for moving said latch means to a position for closure of said drive clutch.

References Cited in the file of this patent

UNITED STATES PATENTS

| | | |
|---|---|---|
| 1,693,645 | Fahrney | Dec. 4, 1928 |
| 1,817,604 | Behan | Aug. 4, 1931 |
| 2,149,866 | Parish | Mar. 7, 1939 |
| 2,179,715 | Davis et al. | Nov. 14, 1939 |
| 2,385,769 | Altorfer | Oct. 2, 1945 |
| 2,612,974 | Krause | Oct. 7, 1952 |